United States Patent [19]

Juhász

[11] 4,453,498
[45] Jun. 12, 1984

[54] GAS- OR OIL-BURNING WARM WATER, HOT WATER OR STEAM BOILER

[75] Inventor: Mihály Juhász, Érdliget, Hungary

[73] Assignee: Energiagazdalkodasi Intezet, Budapest, Hungary

[21] Appl. No.: 520,751

[22] Filed: Aug. 5, 1983

Related U.S. Application Data

[63] Continuation of Ser. No. 323,405, Nov. 20, 1981, abandoned.

[51] Int. Cl.³ .............................................. F22B 7/00
[52] U.S. Cl. ............................. 122/136 R; 122/136 C; 122/367 R
[58] Field of Search ................ 122/367 R, 367 C, 74, 122/183, 135 R, 135 A, 135 F, 136 R, 136 C

[56] References Cited

U.S. PATENT DOCUMENTS

| | | | |
|---|---|---|---|
| 953,023 | 3/1910 | Doran | 122/136 R |
| 2,674,981 | 4/1954 | Clarkson | 122/136 R |
| 3,612,001 | 10/1971 | Gossalter | 122/136 R |
| 3,612,004 | 10/1971 | Cancilla | 122/367 C |
| 4,291,649 | 9/1981 | Boder | 122/136 R |
| 4,299,194 | 11/1981 | Miller | 122/136 R |
| 4,327,672 | 5/1982 | Viessmann | 122/136 C |

FOREIGN PATENT DOCUMENTS 1526932  1/1970  Fed. Rep. of Germany ... 122/136 R

Primary Examiner—Henry C. Yuen
Attorney, Agent, or Firm—Karl F. Ross; Herbert Dubno

[57] ABSTRACT

The invention relates to gas-, or oil-burning warm water, hot water or steam boilers, mainly for the supply of households, communal institutions, and industrial plants, the surfaces of which surrounding the furnace are formed as membrane walls having annular passageways connected by thin plates, the passageways receiving the heat carrying agent.

The essence of the invention is that the flue-tube of the boiler is formed as a body of rotation with varying cross section conforming to the extent of heat radiation, and the flue-tube is surrounded by another convective heat exchanging flue-tube formed as a membrane wall conforming to the shape of the inner flue-tube, the convective heat exchanging flue-tube defining a flue passage with the inner flue-tube, the linings of the membrane wall of the annular passageways of the outer flue-tube being offset in relation to the passageways of the membrane wall of the inner flue-tube.

1 Claim, 6 Drawing Figures

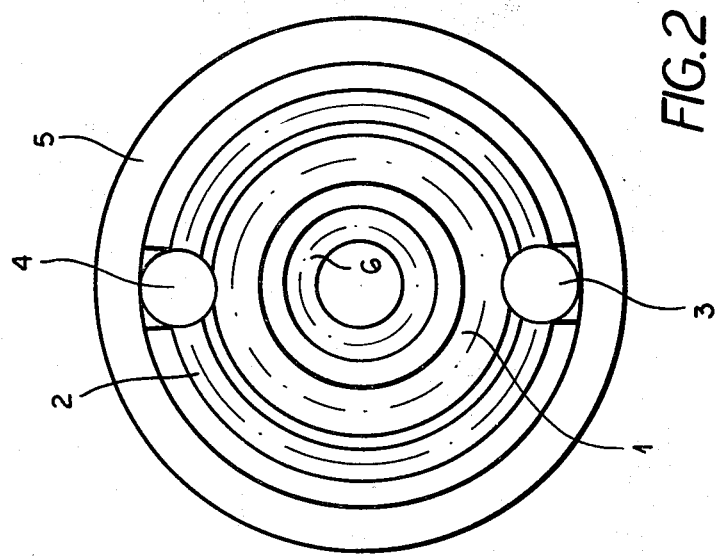
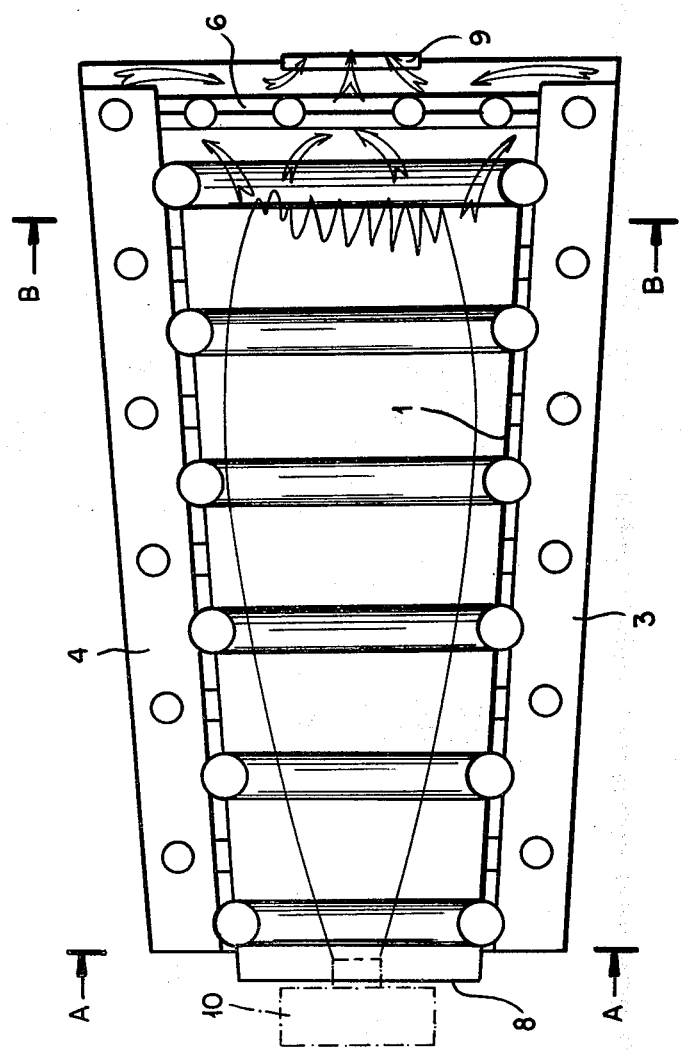

GAS- OR OIL-BURNING WARM WATER, HOT WATER OR STEAM BOILER

This application is a continuation of application Ser. No. 323,405, filed Nov. 20, 1981, now abandoned.

FIELD OF THE INVENTION

The invention relates to gas- or oil burning- warm water, hot water or steam boilers, mainly for the supply of households, communal institutions and industrial plants.

BACKGROUND OF THE INVENTION

Construction of the presently made gas- or oil-burning boilers for the heat supply of industrial plants, caloric centers, public buildings, tenement houses, hotels, etc, was developed by modification and reconstruction of coal-fired boilers.

The original construction was made definitely according to the requirements of coal heating. With the general acceptance of gas and oil heating, the manufacturing firms aimed at making the existing coal-fired construction suitable for oil- or gas heating by minimal reconstruction. Consequently the oil and gas-burning boilers presently do not meet requirements of the up-to-date heating techniques in every respect. During the redesign process of the boilers, the heat dissipation took place first of all through convection, utilization of the radiation energy began at a later stage and this process is still in progress even today. In view of the foregoing it is understandable that certain boiler types, in spite of the mentioned progress hardly deviate from the coal burning constructions.

Two basic types of industrial boiler are distinguished. One of them is a boiler with horizontal furnace, the other one with angular furnace, so-called steep-tube boiler. The systems with low heat output are based on the former one, while those with higher heat output are based on the latter one.

The horizontal boiler system reconstruction amounted only to the removal of the grate and to some modification of the cross section of the flues. The extent of reconstruction indicates that by minimal reconstruction of the boilers designed for coal heating, the conversion to oil- or gas heating could not bring about favorable results. On the other hand, additional disadvantages were the outcome of the above reconstructions, the most important of which is that the traditional flue-tube as constructed does not meet the up-to-date heating and power engineering requirements. At the beginning of the coal heating era, about 80–90 years earlier, the thermal load methods and internal pressure conditions were entirely different in the design of boilers. At that time the power requirements were ensured by the wavy construction. With the use of minimal radiation energy, mainly be convection favorable heat transfer was achieved at lower operating steam pressure, and at lower strength load and smaller wall thickness.

Use of the present up-to-date oil and gas burners offer considerably higher radiation energy. 70–80% of the energy input in the furnace is utilized through radiation and the resultant high thermal load of the furnace surfaces. The proportion of convective heat transfer has decreased from 60–70% to 10–20%. The efficiency has improved, instead of 60–70%, it is up to 80–95%. As a result of these decisive changes the thermal load of the furnace surfaces has significantly increased and the heat distribution has become unstable. The radiation energy may increase even by one order of magnitude along the centerline of the flame starting from the burner in the direction of burning, depending on the heating conditions. At the same time the covective heat transfer both in axial direction and in the horizontal and vertical planes represents a different heat load.

Generally the first part of the flue-tube is subjected to relatively low thermal load, while it is higher in the middle part and excessive in the final part, or in the return band. In addition to the excessive thermal load on a certain part of the flue-tube, due to the boiler system, intensive circulation is not ensured. For this reason the demand for high quality feed-water increases and nonuniform heat extraction appears as an operating condition. This restriction further increases the operation problems and costs.

Further disadvantages of the traditional horizontal boiler systems is that together with the output, the dimension of the structures and the well thicknesses are increasing. The excessive wall thicknesses restrict the improvement of the output. This relationship limits the output range of the boiler. For this reason, operation and manufacture of these structures are not economical at higher output.

A further disadvantage is that the heat transfer coefficient of the surfaces subjected to the highest heat effect, the flue-tube-turn, chamber and tube-wall, is unfavorable.

In contrast with the requirement, the structural element subjected only to convection and to low heat effect i.e. the flue-tube has the more favorable formation with respect to strength. In addition, its heat transfer coefficient and strength factor are even better than those of the structural parts subjected to high thermal load.

The excessively high thermal load, unfavorable cooling, poor heat transfer coefficient and high surface temperature of the radiated surfaces effect the strength factor of the materials as well. This reduces the life of the structures. Life of the original structures was 50 years and that of the present is 15 years. The 70% decline in life is due to the technological drawbacks of the system.

As a result of the drawbacks of the horizontal boiler construction, large apparatus have to be built with only low ouput. There are too many unnecessary built-in parts which represent disadvantages from a functional point of view, machining of the parts requires special machines and skilled workers. Only 50% of the built in surfaces are utilized with respect to the heat transfer. Production of the apparatus is expensive. Their transportation and installation are difficult. They require large space. Their life is only 40%–50% of the expectable.

While the traditional horizontal construction has several drawbacks, it has its advantages as well, in that the furnace is of circular cross section, fitting well the radiation in the radial direction. The thermal loads of the furnace, due to the convection, can be made uniform in radial direction by modifying the extent of radiation.

The confining walls of the more up-to-date boilers with angular furnace and steep tubes are made with membrane walls. These boilers too were developed from the coal variety with significant modifications. The "traditional" however has kept still several unsolved problems, important from a technological point of view with respect of up-to-date heating and power engineering requirements. A further disadvantage of this boiler type is, that with the conversion to gas- or oil heating, life of the boiler is considerably reduced, by about 30–40%. With knowledge of these facts it is necessary to compare the advantages and disadvantages of these boilers.

Disadvantages:

Thermal load of the furnace surfaces is uneven. The het dissipated by radiation varies along the flame centerline. Thermal load of the furnace surfaces, due to the radiation, is minimum in the vicinity of the burner and maximum at the end of the flame, at the rear part and at the partition wall.

The gas fumes arising in the furnace during burning develop at the front of the flame in the minimal and in the middle part in the maximal quantity. Thus with the convective heat transfer the thermal load of the rear furnace surfaces is further increased. Thermal load of the furnace surfaces varies also in radial direction. Density of the infrared heat rays is the maximum where the rays perpendicularly reach the heat receiving surfaces. Thus at the boilers with angular furnace; intensity of the radiation is minimum at the corners and maximum along the line of the planes in the horizontal and vertical axial direction. Moreover, by convection, the maximal thermal load reaches the surfaces at the top.

Neither the natural, nor the forced circulation follow the varying thermal loads of the furnace and its adjustment meets with difficulties. Thus the surface temperature of the parts subjected to critical thermal load is considerably higher than the required value.

The adverse power engineering conditions effect the qualitative requirements of the feedwater as well, resulting in significant investmentincrease. The danger of breakdown exists. Its life is below the expectable by 40–50%. Utilization of the built in surfaces is 60% with respect to the heat output. The unnecessarily parts increase the cost of production.

An advantage of the boiler system with steep tube and membrane wall, is that the strength of the structures is independent from the increase of the output. Thus in the boilers of higher heat output, the wall thickness of the surfaces subjected to the maximum thermal load, strength and heat transfer ratio, is favorable. The ratio of the calorifer and heat dissipating surfaces is greater by 1.7 than that of the horizontal constructions. Its strength ratio, at indentical heat output is 10-times more favorable, than obtainable in the flue-tube-type (horizontal) boilers.

OBJECTS OF THE INVENTION

The invention is aimed at elimination of the disadvantages of the coal type construction of gas or oil-burning boilers, while preserving and further increasing the advantages.

The problem to be solved with the invention is the realization of a boiler having calorifer surfaces with maximum heat utilization, excellent efficiency, long life and producible with up-to-date production technology, which ensures higher operational safety and economical operation at lower material utilization, than those used so far.

SUMMARY OF THE INVENTION

By using the most up-to-date heating and power engineering test results, and mainly by utilizing the furnace test results conducted with the aid of the infrared technique, the invention is based on the recognition that the cross section of the flue-tube has to be changed so as to conform to the distribution and extent of the radiation thermal energy and convective heat transmission, which ensures the uniform thermal load of the furnace surfaces. Further recognition is that by open water-side circulation controlled according to the heat transmission, uniform heat transmission and thereby further life-prolongation are obtained.

The objective according to the invention is attained by the formation of the flue-tube of the boiler as a body of rotation, the cross section of which varies according to the extent of the heat radiation. A distribution chamber is arranged at the bottom and the flue-tube is formed by a convective heat exchanging surface having as a membrane wall conforming to the shape of the heat radiation and having a plurality of annular passageways, the convective heat exchanging surface defining a flue with a similar outer flue-tube, the annular passageways membrane wall of the outer convective heat exchanging surface being displaced in relation to the annular passageways of the membrane wall of the inner flue-tube.

In a preferable embodiment according to the invention, the flue-tubes are formed as truncated cones expanding away from a burner-holding front wall towards a rear wall.

In a further preferable embodiment according to the invention a further flue is formed between a heat insulated cover of the boiler and outer convective heat exchange surface.

BRIEF DESCRIPTION OF THE DRAWING

The above and other objects, features and advantages of the invention will become more readily apparent from the following description, reference being made to the accompanying drawing, in which:

FIG. 1 is a diagrammatic longitudinal section of the boiler according to the invention taken in a vertical plane;

FIG. 2 is a cross section of the boiler shown in FIG. 1, taken along line A—A thereof

SPECIFIC DESCRIPTION

Figure 4:
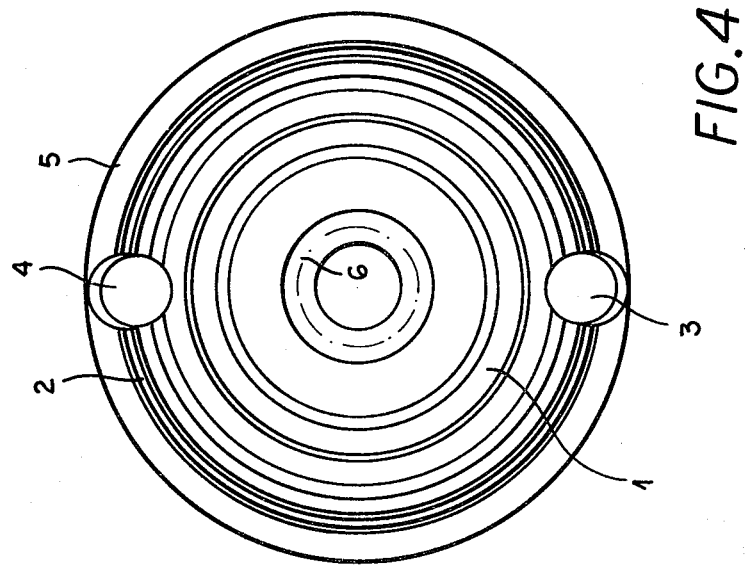
FIG. 4 is a cross section of the boiler shown in FIG. 1, taken along line B—B thereof.
Figure 3:
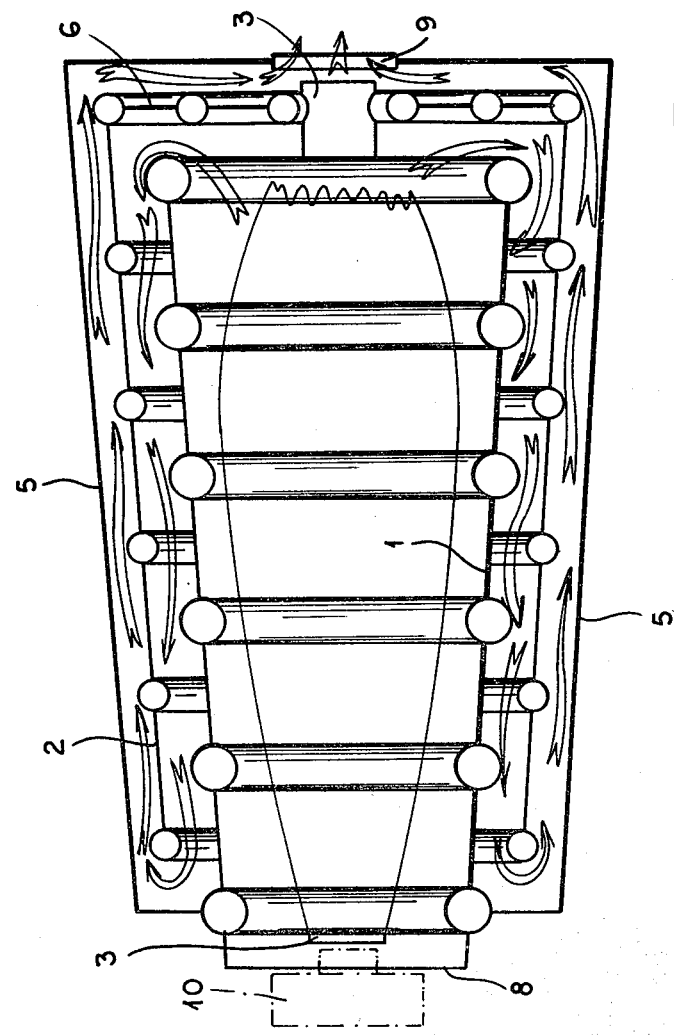
FIG. 3 is a longitudinal section of the boiler shown in FIG. 1 taken in a horizontal plane.

As shown in the drawing, the two embodiments given by way of example are of identical contstruction and operation in their most important details, thus the identical details were denoted with the same reference numbers in both embodiments. As shown in the following, only the direction of flue-gas conduction the difference between the two constructions.

The essence of the boiler according to the invention is disclosed by the construction shown in FIGS. 1–4.

As illustrated in the diagrams, the furnace of the boiler according to the invention is limited by the truncated cone-shaped backwards expanding flue-tube 1, the shape of which conforms to the radiation energy variation emitted by the flame of burner 10 fixed to the front wall 8 of the boiler. This shape however may be spherical or another body of rotation with varying cross section according to the distribution of the heat radiation along the center line of the flame, depending on the size of the flame, temperature and length of the infrared waves. This varying cross section ensures that the maximal heat transfer surfaces are on the parts subjected to the maximum thermal load, which enables partly better utilization of the energy, and partly the care of the apparatus and prolongation of its life.

Flue-tube 1 is formed as a membrane wall, i.e. the wall of the flue-tube is formed by the passageways receiving the heated agent and by the passage-connecting relatively thin annular plate sections or webs. This already known configuration enables partly the effective heat transfer and partly structural material saving, yet sufficient strength. The burner-holding front wall 8 is formed similarly as annular membrane wall. The end wall to 6 of the flue-tube 1 is formed by concentric water pipes, along which the flue-gas passes into the return band, represented, by wall 6, then into the flue passage representing the second draft. The flue passage representing the second draft is defined between the flue-tube 1, the convective heat transfer flue-tube 2. Both the wall 6 confronting the return band and the convective heat transfer flue-tube 2 are formed as membrane walls. An essential characteristic of the invention is that the annular passageways of the membrane wall of the convective heat transfer tube 2 are offset or staggered by half the distance between the passageways of the membrane wall of the flue-tube 1, i.e. they are arranged with a displacement representing half of the distance between two adjacent passageways. Thus the flue gases flow between them a longitudinal direction along concentric wave-lines whereby the gas flow undulates, which considerably improves the convective heat transfer, since the flue gas velocities increase along the wall. At the end of the flue passage forming the second draft, the flue-gases turn into the flue passage formed as the third draft, which flue is defined between the convective heat transfer tube 2, and the heat insulated jacket 5. In this draft the flue-gases transfer their residual heat to the convective heat transfer tube 2, thus the heat utilization of the built-in heat transfer surfaces faces is 100% against 50-60% obtained so far. Since the convective heat transfer tube 2 follows the shape of the flue-tube 1, the size of the convective heat transfer surface is also in proportion with the amount of thermal energy transferred by convection, i.e. the hottest flue-gases reach the greatest heat transfer surfaces, thus the heat transmission conforms to the extent of the thermal load.

Otherwise the flue-gases pass out the flue stub 9 at the end of the boiler.

As far as the water-side of the boiler is concerned, the passageways of the membrane walls run together at the bottom and top in the distribution chamber 3 and in the upper collecting chamber 4. The stub of the return of descending duct is in the lower distribution chamber 3, while the stub of the forward or ascending duct is formed in the upper collecting chamber 4, through which the boiler is connected to the heat extraction system, or in the case of a steam boiler, to the drum.

Figure 6:
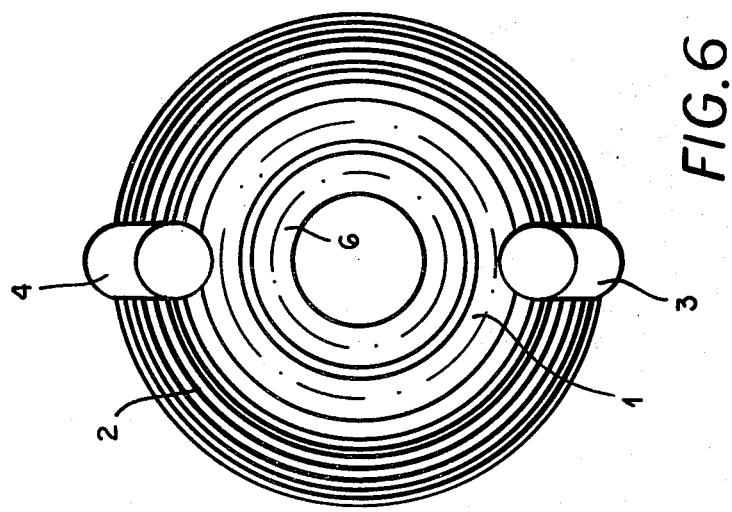
FIG. 6 is a cross section of the boiler shown in FIG. 5, taken along line C—C thereof.
Figure 5:
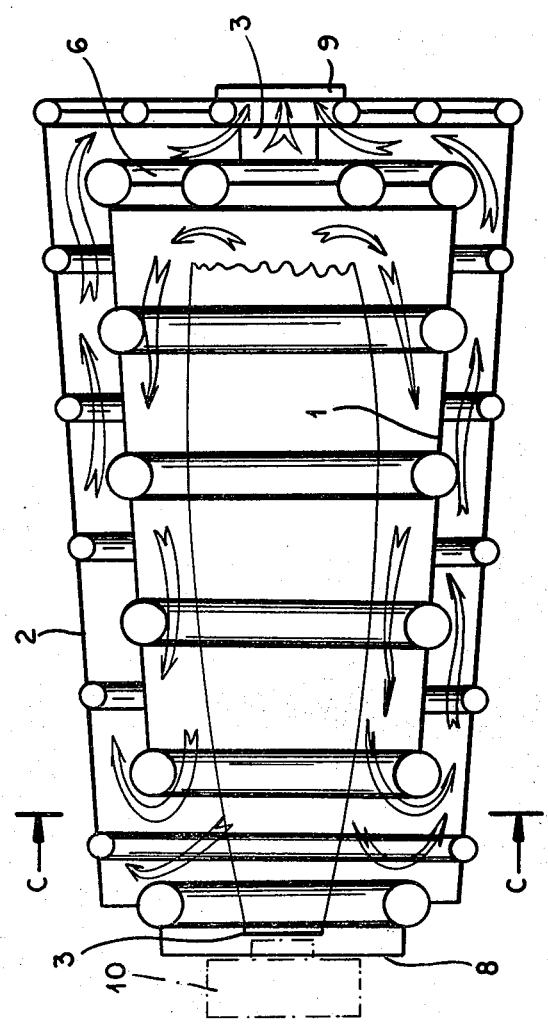
FIG. 5 is a diagrammatic longitudinal section of the boiler according to another embodiment the invention.

The other embodiments formed as a so-called bag furnace shown in FIGS. 5 and 6, differs from the former only in that the flue-tube 1 is sealed to be gastight in the rear by wall 6, thus the flue-gases flow back as second draft to the front of the boiler within the flue-tube 1, where through suitable openings pass into the flue passage formed as the third draft surrounded on the outside by the flue-tube 2, then through the flue stub 9 at the end of the boiler where they pass into the chimney through the fore- and aftersurfaces built-in as necessary.

In the boiler according to the invention the water-side circulating circuits are formed as to ensure the heat transmission either by natural or forced flew or circulation. This task is carried out by the lower distributing chamber 3 and upper collecting chamber 4. In the case of a steam boiler the descending and ascending ducts connecting the drum which joins the distribution chambers, ensure the uniform heat transmission with their arrangement and cross section.

The tube system contains low impact resistance therefore the resistance of the circulating system is low. Thus intensive flow is ensured.

The most prominent advantages of the boiler according to the invention are summed up as follows;

Heat utilization of the built-in heat transfer surfaces is 100% instead of 50-60% characteristic of the constructions available up to now.

Due to the uniform heat conditions and heat flow, the requirement concerning the quality of the feed-water is diminished and the structure endures the heat extraction variations more favorably.

The strength conditions of the boiler according to the invention do not depend on the output of the boiler, i.e. the output can be increased without reducing the strength factor or the connected heat transfer coefficient. Thus the construction of the boiler does not limit the heat output, but ensures efficient heat transfer, the cross-flow of the flue-gases and 100% utilization of the heating surfaces.

The fundamental improvement of the strength conditions is consequent upon the use of the membrane walls, whereby only a fraction of the former wall thickness is needed. The smaller wall thickness enables considerably more favorable heat transfer, fabrication material economy, lower heat inertia, more economical production and less space requirement and investment.

Thus the boiler according to the invention not only combines the advantages of the former boiler constructions, but further improves those with respect of strength, heat transfer, circulation and heat utilization.

I claim:

1. A fuel-burner, comprising:
   a vertical wall;
   a burner provided in said vertical wall and generating a flame generally centered on a horizontal axis extending away from said wall;
   a first heat-exchanging tube in the form of a membrane wall enclosing said flame, extending from said vertical wall, centered on said axis and of frustoconical configuration with a flow cross section progressively increasing away from said vertical wall and said burner, said membrane wall of said first tube being defined by axially spaced annular passageways of circular cross section and of progressively increasing annular diameter away from said vertical wall, and by thin annular plate sections bridging said passageways whereby said passageways bulge inwardly and outwardly on said first tube, said passageways carrying a fluid to be heated;
   a second heat exchanging tube coaxial with said first tube and frustonically diverging away from said vertical wall and defining a flue gas passage around said first tube from an end thereof remote from said vertical wall to an end of said second tube proximal to said vertical wall, said second tube being formed as a membrane wall from an array of axially spaced annular passageways of circular cross section carrying said fluid interconnected by respective thin annular plate sections whereby the passageways of said second tube bulge into said passage, the passageway of said second tube being staggered with respect to the passageways of said first tube so as to lie substantially halfway between the passageways of said first tube;

means for discharging flue gas after it has traversed said passage, said means including a heat-exchanging wall formed at the end of said second tube remote from said vertical wall and constituted by a plurality of concentric passageways traversed by said fluid, radially spaced apart and bridged by coplanar annular thin plate sections whereby the passageways of said heat-exchanging wall bulge toward said vertical wall and said flue gas passes along said heat-exchanging wall, and a jacket surrounding said second tube and defining a second passage therewith traversed by said flue gas, said passageways of said second tube bulging into said second passage.

* * * * *